Dec. 30, 1941.  A. J. SCHOLTES  2,268,088
SPIRAL EXPANDER TOOL
Filed June 29, 1938  2 Sheets-Sheet 1
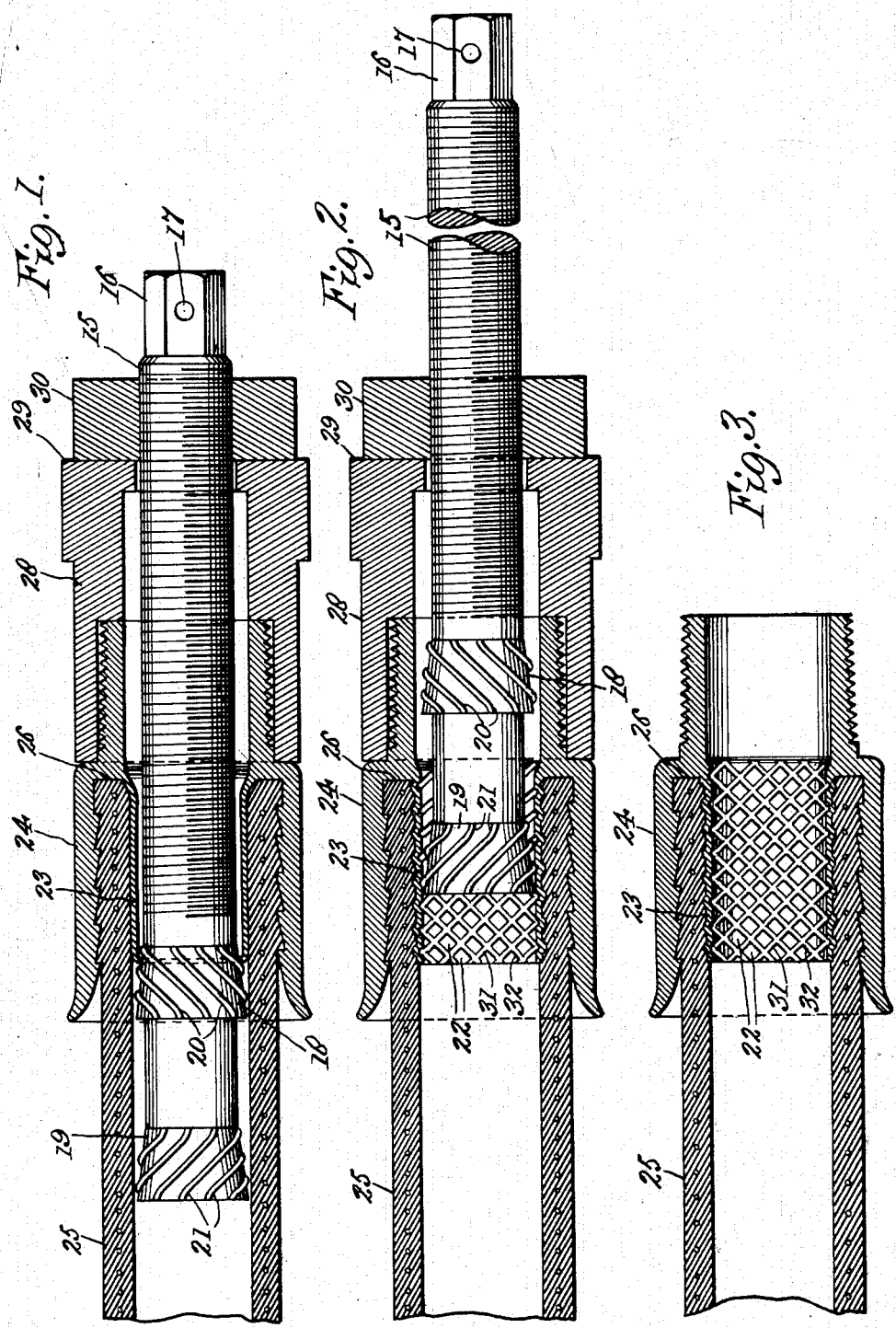
Inventor
Albert J. Scholtes
By Mawhinney & Mawhinney
Attorneys.

Dec. 30, 1941.  A. J. SCHOLTES  2,268,088
SPIRAL EXPANDER TOOL
Filed June 29, 1938  2 Sheets-Sheet 2
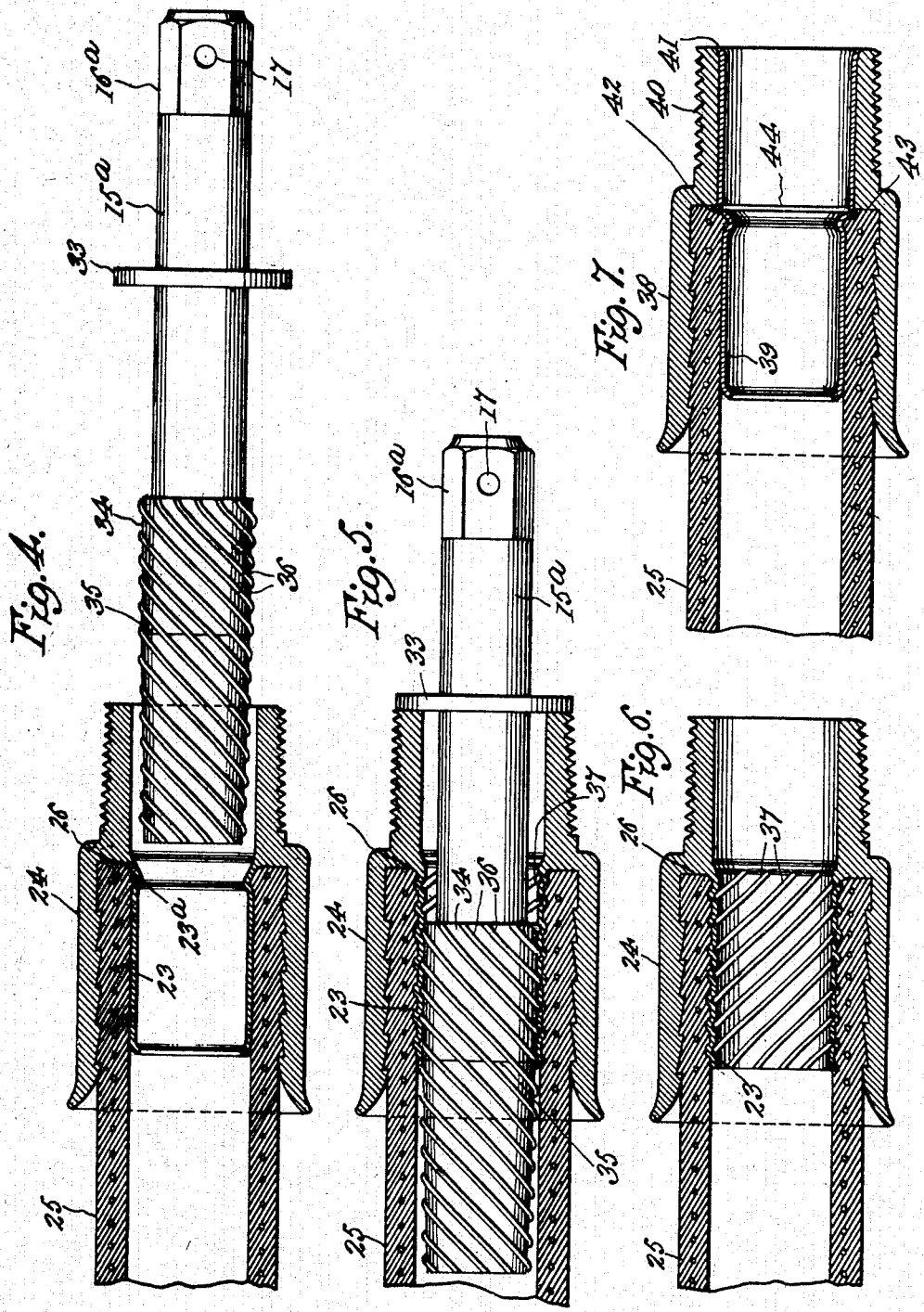
Inventor
Albert J. Scholtes
By Mawhinney & Mawhinney
Attorneys.

Patented Dec. 30, 1941

2,268,088

UNITED STATES PATENT OFFICE 2,268,088

SPIRAL EXPANDER TOOL

Albert J. Scholtes, Baltimore, Md.

Application June 29, 1938, Serial No. 216,573

3 Claims. (Cl. 29—88.2)

The present invention relates to expander tools, and more particularly to the type adapted to expand tubes, pipes and the like.

An object of the present invention is to provide an expander tool adapted to be forced or drawn through a pipe or tube for not only expanding it but also to deform the wall of the tube and provide helical corrugations, beads, ridges or other projections upon the outer surface of the tube which are adapted to interfit or embed in the inner wall portion of a hose, another tube, pipe or the like for interlocking the parts together.

The invention also aims at the provision of a tool which may be drawn through a tube for expanding the tube and for corrugating or bending the wall of the tube to provide helically arranged beads at the outer surface of the tube, the tool in forming the helical beads being given a turning motion during advancement for reducing the frictional resistance of the tool to pass through the tube.

Another object of the invention is to provide an improved expanding tool of this character which is provided with spaced apart heads with spiral ribs thereon, the ribs on one head extending in a direction opposite to the ribs of the other head so that the first head in passing through the tube provides helical threads in one direction on the tube while the second head when advanced into the tube provides helical ribs in an opposite direction and which intersect the first ribs, thus providing crossed and angularly disposed beads or projections upon the outer surface of the tube to secure anchorage of the tube in a hose or the like.

The invention also provides an improved expanding tool which admits of its operation either by drawing or forcing through a tube, and wherein the helical ribs of the tube in all instances effect a turning of the tool head during its passage through the tube for not only reducing the resistance to the operation of the tool, but to also aid in the expansion of the tube and the formation of the beads therein without danger of cracking or otherwise damaging the tube.

The invention has for a further object to provide an expander tool adapted for use particularly in securing together the parts of a permanent hose coupling which is made the subject matter of a copending application filed of even date herewith and which is adapted to provide helical beads upon the outer surface of the tube for embedding in the inner wall of the hose while expanding the tube so that the hose is compressed, sealed and locked in the coupling member.

With the foregoing and other objects in view, the invention will be more fully described hereinafter, and will be more particularly pointed out in the claims appended hereto.

In the drawings, wherein like symbols refer to like or corresponding parts throughout the several views.

Figure 1 is a central longitudinal section taken through a hose coupling having the improved tool applied thereto and ready for operation to secure the members of the coupling together.

Figure 2 is a similar view showing the tool after partial operation and wherein one of the heads of the tool have passed through the tube of the coupling and the second head is following through the tube.

Figure 3 is a longitudinal section taken through the hose coupling produced by use of the tool.

Figure 4 is a side elevation of a hose coupling prior to being expanded or locked together and showing a modified form of the tool in position for operation on the hose coupling.

Figure 5 is a similar view showing the modified form of tool after it has been fully driven into the coupling.

Figure 6 is a longitudinal section through the form of coupling produced by the modified form of tool, and Figure 7 is a longitudinal section through another form of coupling having the tube as a separate part of the coupling member, and upon which either form of the tool of this invention may operate.

Referring now to the drawings, and first to Figures 1, 2 and 3, the tool comprises a shank 15 which is screw threaded for a considerable distance inwardly from its outer end, and which at its outer end may be provided with an angularly faced wrench receiving portion 16 at its forward end. The wrench receiving portion 16 may also be provided with a through opening 17 if desired for the reception of a pin or the like to facilitate the operation of the tool. At its inner end, the shank 15 is provided with a pair of spaced apart heads 18 and 19. The heads 18 and 19 are spaced apart a distance substantially to the length of the tube to be operated upon so that the heads may pass one at a time through the tube and operate independently therein. The heads 18 and 19 have a slight forward taper so that their forward ends may freely enter the adjacent end of a tube while the larger rear end of the heads are of greater diameter than the initial diameter of the tube for effecting the expansion of the tube as the heads advance therethrough. The heads 18 and 19 may be of the same size or dimensions, or may be otherwise as found convenient for use and in accordance with the desired final tube structure.

The head 18 is provided with a plurality of coarse threaded spiral ribs 20 which extend in one direction about the head 18 throughout the length of the head and are adapted to helically bead, corrugate, ridge or otherwise deform the wall of the tube as the head 18 is advanced through the tube, and during the expansion of the tube. These ribs 20, take into the wall of the tube, cause the head 18 to turn as the head is advanced lengthwise through the tube, and thus reduce the frictional resistance of the head as it is moved through the tube.

The second head 19 is provided with similarly formed spiral ribs 21 which extend about the head throughout its length but which extend spirally in an opposite direction to that of the ribs 20. As soon as the head 18 is passed through a tube, the head 19, carried on the rear end of the shank 15, is moved into the tube and effects the helical corrugating, ridging or beading of the wall of the tube in crossed relation with respect to the beading formed by the ribs 20 of the first head so that the helical beads formed by the second head intersect the beads formed by the first head and provide a crossed structure having diamond shaped depressions 22 in the outer surface of the tube.

The tool is adapted to be drawn through a tube, such as the tube 23 of a hose coupling. The hose coupling has an outer sleeve 24 surrounding the tube 23 in spaced relation thereto and the end of a hose 25 is inserted in the space between the sleeve and the tube. The sleeve and the tube may be connected together as an integral structure at the inner end of the coupling member by means of an annular shoulder 26 receiving thereagainst the extremity of the hose 25.

In securing the coupling member on the end of the hose, the tool is first inserted in the end of the hose with the heads 18 and 19 thereof spaced backwardly from the extremity of the hose. The coupling member is now slid over the outer end of the shank 15 of the tool and is fitted upon the end of the hose 25. A spacer sleeve 28 may now be freely slid over the outer end of the shank 15 of the tool and is recessed to receive the outer end of the coupling member so that the spacer 28 is shouldered to bear against the outer end of the coupling. The outer end of the spacer sleeve 28 has a flat face 29 against which engages a rotatable nut 30 having threaded engagement upon the outer end of the shank 15. The flat faces of the nut 30 and the end 29 of the spacer sleeve are relatively smooth, or may be provided with any suitable thrust bearing or means therebetween to admit of the free and easy turning of the nut 30 against the end of the spacer sleeve. The turning of the nut 30 draws the shank 15 outwardly through the coupling member of the hose coupling as the nut 30 is held from axial movement against the outer end of the spacer sleeve 28 and consequently considerable leverage is provided by the turning of the nut for drawing the heads 18 and 19 forwardly through the tube 23 of the hose coupling. As the head 18 approaches the adjacent end of the tube 23, the tapering forward end of the head enters the tube and the head gradually engages the tube and expands it against the hose 25, the ribs 20 corrugating or beading the wall of the tube 23 and forcing the beads into the inner surface portion of the hose 25 for effectively anchoring the hose against withdrawal from the coupling member and cooperating with the expansion of the tube 23 to compress the hose into the inner wall of the coupling sleeve 24 and against the shoulder 26. Thus, as the shank 15 is drawn forwardly by the nut 30 the head 18 is advanced through the tube 23 and the ribs 20 of the head effect the rotation of the head in the line of least resistance, or in the direction of the spiral ribs 20 so that the expansion and beading of the tube 23 is effected by a rotary and wedging action.

The expander heads 18 and 19 are shown as part of the shank 15 and rigid therewith. These heads may be mounted on the shank in any other suitable manner. The coarse threading of the beads 20 and 21 causes the heads to turn slowly in the tube being expanded while the fine threads on the shank 15 permits the shank to advance slowly under action of the freely turning nut 30, the nut of course turning at a relatively greater speed than that of the rotation of the heads, and the difference in turning and advancement being taken up through the turning of the shank 15 in the nut 30.

As shown in Figure 2, after the head 18 has passed through the tube 23, the tube is provided with helical beads 31 extending in one direction and which are firmly embedded in the inner wall of the hose 25. The second head 19 enters the adjacent end of the tube 23 and the ribs 21 thereof engage in the inner wall of the tube and expand the engaging portions of the wall into helical ribs 32 which extend in an opposite direction to the ribs 31 and which intersect the same to provide the diamond shaped intermediate flat wall portions 22. On the outer surface of the tube 23 these diamond shaped flat portions are in the form of depressions into which are moulded or compressed the inner surface portion of the hose 25, thus providing a relatively large number of independent points of anchorage between the hose and the tube. As the beads 31 and 32 are of helical form and intersect one another, they provide angularly disposed abutments embedded in the hose 25 so as to hold the latter not only against axial strain but also against torsional strain.

After the two heads 18 and 19 have passed through the tube 23, the hose coupling is left in the form shown in Figure 3 wherein the end of the hose is securely locked and sealed in the coupling member not only by the deforming of the tube 23 but also by the compression and deforming of the end of the hose 25.

In the form of the invention shown in Figures 4 and 5, the shank 15ª of the tool is provided with the wrench receiving portion 16ª at its outer end, and spaced inwardly from the portion 16ª is an annular stop flange 33 adapted to engage against the outer end of the hose coupling to limit the inward thrust or movement of the shank 15ª.

The inner end of the shank 15ª is provided with a relatively long head 34 which at its forward end may be of substantially cylindrical construction, such as to the point indicated by the broken line 35, and which has a gradual taper from the plane of the line 35 to the rear end of the head, as shown. The head 34 is provided from end to end with coarse spiral ribs 36 extending in one direction and which are adapted to engage the inner wall of the tube 23 from the outer end thereof as the expander tool is forced through the coupling. If desired, the forward end of the tube 23 may be provided with an inwardly struck annular bead or ridge 23ª which provides a relatively short constricted neck portion to the tube 23 to facilitate the engagement of the spiral ribs 36 into the inner wall of the tube 23 and to thus initiate the rotation or turning of the expander tool as it is turned or otherwise forced into the tube 23. As the tool head 34 tapers at its rear end, the bead or ridge 23ª of the tube as well as the body portion of the tube are gradually expanded from the position shown in Figure 4 to that shown in Figure 5 and at the same time the ribs 36 of the head corrugate or expand the walls of the tube so as to provide therein the helical beads which extend through the walls of the tube 23 and project from the outside thereof for embedding in the inner wall of the hose 25, during the expansion of the tube. As shown in Figure 5, the stop flange 33 is so disposed upon the shank 15ª as to strike the outer end of the coupling upon the passage of the entire tapering rear end of the head 34. This brings the cylindrical inner portion of the head 34 entirely through the tube 23 so as to uniformly expand the tube throughout its length, and at the same time the head 34 is retained in threaded engagement with the tube so that the tool may be readily removed from the hose coupling by merely rotating the shank 15ª with its head 34 in a reverse direction.

As shown in Figure 6, the completed coupling is shown with helical beads 37 extending in one direction and with the tube 23 expanded against and into the inner wall of the hose 25 to compress the latter against the sleeve 24 of the coupling and against the sealing shoulder 26. Of course the ribs 36 on the tool head 34 may extend in an opposite direction, and be made of any desired pitch or depth to suit conditions of the work.

In Figure 7 the form of hose coupling may be of the type wherein the sleeve 38 is provided with an inner part or tube 39 which is formed separately from the sleeve 38 and assembled therein. In this instance the tube 39 extends through the outer end 40 of the hose coupling and is slightly flared at its outer end as at 41 and slightly crimped in the opposite end of the coupling as at 42 to engage the inner edge portion of the shoulder 43 of the sleeve 38. In this instance the portion of the tube 39 disposed within the sleeve 38 may be ridged or beaded inwardly as at 44 to initially receive the reduced end and the ribs of the tool head. The operation of the tool upon this form of hose coupling is identical to that shown in Figures 1 and 4.

It is apparent that the head 34 of the form shown in Figures 4 and 5 may be reversed on the shank 15ª and be operated by drawing outwardly through coupling instead of being forced inwardly as shown in Figures 4 and 5. In this instance the stop flange 33 is not used and the shank 15ª is of suitable length to admit insertion of the head 34 prior to and beyond the coupling tube 23. The operation and results are the same in both instances.

What is claimed is:

1. A spiral expander tool for expanding permanent hose couplings having a nipple engaging in the end of a hose, comprising a shank, a pair of frusto-conical heads on said shank adjacent one end thereof, means carried by the other end of the shank adapted to draw said shank and heads outwardly through said hose coupling nipple, each of said heads having their small ends toward said other end of the shank to provide a taper in the direction of withdrawal through the nipple, one head having exterior spiral ribs extending in one direction and the other head having exterior spiral ribs extending in the other direction, whereby upon withdrawal through the nipple to expand the same the first head forms helical beads in one direction in the wall of the nipple and the second head forms helical beads in the wall of the nipple extending in an opposite direction intersecting the first helical beads, said intersecting helical beads adapted to embed in the inner wall of the hose and provide depressions between the beads for receiving spaced portions of the hose.

2. The herein described process for assembling flexible hose to metallic couplings in which the hose is received over a drawn metal radially expansible nipple, which consists in axially moving an expanding tool having a substantially conical head through the nipple, simultaneously with its axial movement rotating said head to cause the cone surface to progress diagonally across the line of the grain structure and other imperfections of the drawn metal nipple, and coincident with both of the foregoing steps locally deforming the nipple through its cylindrical wall to create high and low spots externally on the nipple with the high spots embedded in the hose.

3. The herein described process for assembling flexible hose to metallic couplings in which the hose is received over a drawn metal radially expansible nipple, which consists in axially moving an expanding tool having a substantially conical head through the nipple, and simultaneously with its axial movement rotating said head to cause the cone surface to progress diagonally across the line of the grain structure and other imperfections of the drawn metal nipple.

ALBERT J. SCHOLTES.